INVENTOR
RUDOLPH A. MATHEISEL
BY
Julian C. Renfro
ATTORNEY

INVENTOR
RUDOLPH A. MATHEISEL
BY
Julian C. Renfro
ATTORNEY

United States Patent Office 3,266,422
Patented August 16, 1966

3,266,422
RECHARGEABLE ACCUMULATOR SYSTEM FOR AUXILIARY POWER SUPPLY
Rudolph A. Matheisel, 6000 Walther Ave., Baltimore 6, Md.
Original application Dec. 27, 1957, Ser. No. 722,111, now Patent No. 3,088,696, dated May 7, 1963. Divided and this application Dec. 5, 1961, Ser. No. 163,948
6 Claims. (Cl. 102—49)

This invention is a division of the Power Supply Auxiliary patent granted under the provisions of Rule 47b on May 7, 1963, in the name of R. A. Matheisel and bearing Patent No. 3,088,696.

The present invention relates to an improved electric and hydraulic power supply auxiliary system for the control equipment of an airborne guided missile, and more particularly to such a system which is compact and lightweight.

The electric and hydraulic power required to actuate the guidance system and aerodynamic control surfaces of a guided missile are usually provided by means of a power supply auxiliary, and not by the missile propulsion motor. An example of such a power supply auxiliary is described in Patent No. 2,723,528, issued November 15, 1955, to S. Stark et al., assigned to Martin-Marietta Corporation, assignee of this case, and entitled, "Auxiliary Power Package." That patent discloses a power supply auxiliary wherein a solid propellant charge, of the type commonly used for rocket propulsion, is continuously burned to produce a gas at a highly regulated pressure. The pressurized gas thus produced is employed to drive a turbine which in turn drives an alternator for generating the required electrical energy. The gas is also employed to pressurize an hydraulic reservoir which provides the required hydraulic power.

The power supply disclosed in the Stark patent has proven to be adequate for a missile for relatively short flight duration, for example a missile of the air-to-air type. With a missile of longer flight duration, however, the volume and weight of solid propellant charge required by the Stark gas generator becomes so large as to conflict with the aerodynamic design requirements of the missile.

It is one of the objects of the present invention to provide a power supply auxiliary adapted for use in a relatively long flight duration missile. To this end a pressurized gas generator is provided which is both compact and lightweight, consistent with the areodynamic design requirements of the missile.

In providing such a gas generator the present invention recognizes that a large portion of the solid propellant charge employed by the prior Stark patent generator is utilized in the production of large amounts of unneeded gas. This is due to the fact that a burning propellant charge generates gas continuously regardless of the requirements of the missile control equipment. As a result there is an excess accumulation of gas which is required to be exhausted into the atmosphere with attendant loss.

In the portion of the present concept covered by Patent No. 3,088,696 mentioned above, an improved generator is adapted to effect a conversion into gas of working increments of the propellant charge, only as required for the operation of the missile control equipment. To this end the generator employs a plurality of explosive charge units arranged to expel gas into a storage vessel only when triggered. The pressurized gas thus produced is employed to operate the hydraulic and electrical drive units of the power supply. A demand valve which only allows flow upon system demand as sensed by a decrease in system pressure is provided between the gas generator and drive units so that depletion of the gas supply takes place only when required by the missile equipment. In accordance with the working increment principle such gas generator is adapted to explode a charge unit whenever the gas supply within the storage vessel is depleted to a predetermined working pressure minimum. This is effected by means of a gage adapted to measure the gas pressure within the storage vessel and to produce a command signal whenever the gas pressure therewithin decreases to the predetermined minimum. Trigger means responsive to such a command signal is then provided for exploding the charge units. The trigger means is adapted to fire a charge unit in response to each command signal and to fire the plurality of charge units in a predetermined order. In this way the gas pressure within the storage vessel is always maintained at sufficient pressure to operate the missile control equipment while the bulk of the required propellant charge is held to a minimum.

It is a goal of the present invention to provide an alternative, compact and lightweight pressurized gas generator for the operation of the hydraulic and electric drive units of the power supply, which generator is adapted to produce pressurized gas by the use of energy derived from the propulsion motor of the guided missile. Such a propulsion motor is conventionally of the reaction type ejecting an elastic fluid from a generation chamber at some predetermined pressure and temperature. Heretofore the use of such energy has been neglected due to the fact that a missile reaction motor normally cuts off from operation prior to the termination of the missile flight, while the power supply auxiliary must ordinarily provide a continuously available supply of energy throughout the duration of the missile flight.

It is therefore a basic object of the invention to provide in a power supply auxiliary for a relatively long flight duration missile, a lightweight and compact gas generator which employs energy from a missile reaction motor to produce pressurized gas not only while the reaction motor is operative but also during the interval of time between motor "burn out" and target-strike by the missile.

To this end the improved gas generator comprises a conduit means connected to bleed pressurized gas from the reaction motor of the missile. The bled gas is not at a pressure high enough to operate the electrical and hydraulic drive units of the power supply. For this reason the invention provides a compressor engine adapted to raise the pressure of the bled gas up to a predetermined higher value. The compressor engine has a first and second inlet port connected to the conduit means respectively, and an outlet port. The engine is adapted to be operated by the pressurized elastic fluid entering the first inlet port and to compress pressurized elastic fluid entering the second inlet port to the predetermined higher pressure at the outlet port. To provide a continuously available supply of this pressurized gas for the operation of the drive units of the power supply, the invention provides a gas accumulator adapted to store pressurized elastic fluid therewithin. The outlet port of the compressor engine is then connected to the accumulator by conduit means so that the pressurized gas compressed by the engine is conducted to the accumulator for storage. On-off or command valve means are connected between the accumulator and the drive units of the power supply so that a depletion from the accumulator will occur only when gas is required for the operation of the drive units. Thus, by making the accumulator tank large enough to store a quantity of gas sufficient to operate the missile control equipment from motor burn out to target-strike the improved gas generator provides pressurized gas throughout the flight time of the missile.

The gas generator embodiment above described is limited to use in guided missiles employing propulsion motors of the pressurized elastic fluid, reaction type. Otherwise it may be used interchangeably with the first described embodiment to operate the electrical and hydraulic drive units of the power supply.

An additional factor making the power supply disclosed in the Stark patent unsatisfactory for long-range missiles is the large weight and size of the hydraulic reservoir employed. It is another object of the invention to provide in a power supply auxiliary for a relatively long flight duration missile, an improved unit for the production of hydraulic power which is materially reduced in weight and size in comparison with the pressurized hydraulic reservoirs heretofore employed.

In providing such a unit the invention recognizes that pressurization of the entire required hydraulic fluid volume is unnecessary and adds considerably to the bulk of the hydraulic unit. Accordingly, the improved unit of the invention is adapted to pressurize working increments of hydraulic fluid, only as required for the operation of the missile control equipment.

To this end the improved unit comprises a reservoir of hydraulic fluid which is ordinarily at atmospheric pressure. The output of this reservoir is connected through a fluid injector into a demand vessel. The fluid injector is operated by the pressurized gas from the gas generator and adapted to pump increments of hydraulic fluid from the reservoir into the demand vessel. The demand vessel is adapted to maintain the fluid therewithin above a predetermined minimum pressure. The output of the demand vessel is then connected through demand valve means to an actuator unit operable by hydraulic fluid and adapted to operate the missile control equipment.

In this way, hydraulic fluid is depleted from the demand vessel only when required by the actuator unit. In addition, only a small working increment of the total hydraulic fluid volume within the reservoir is pressurized to maintain the pressure within the demand vessel above the predetermined minimum. Individual components such as pressurizing cylinders and pistons of large physical dimensions and heavy weight may be therefore replaced by relatively small components performing an equivalent function.

The invention can be best understood by referring to the following drawings in which.

Figure 1:
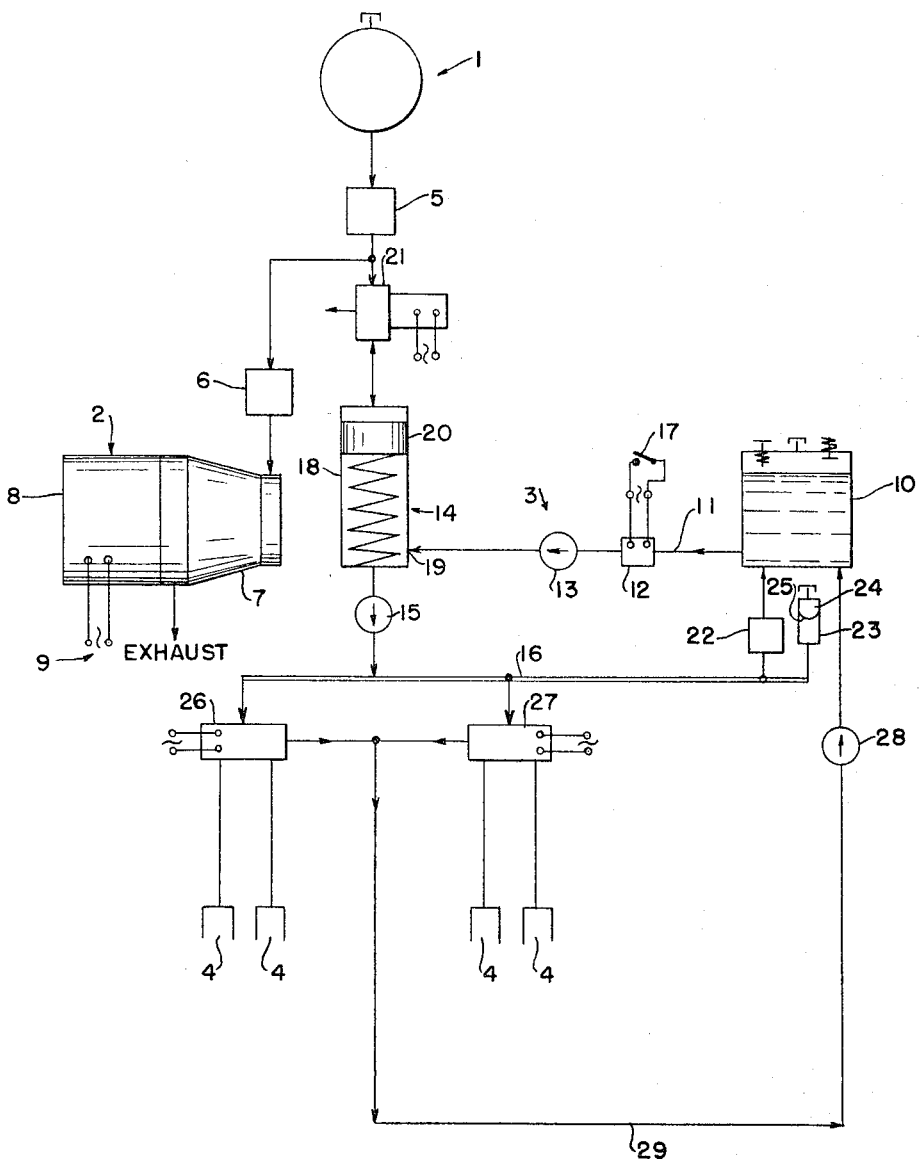
FIG. 1 is a schematic diagram of a basic power supply auxiliary.

Referring to FIG. 1 the power supply auxiliary basically includes a gas generator 1 operating an electrical unit 2 and an hydraulic unit 3. Although in the illustrated embodiment the electrical unit and hydraulic unit are operated in parallel, series operation is also within the contemplation of the invention and may be preferable in some instances. The electrical unit 2 is employed to produce electrical power for the operation of the electronic guidance system of the missile. The hydraulic unit 3 is employed to operate hydraulically motivated actuator pistons 4 which operate the aerodynamic control surfaces of the guided missile.

The pressurized gas from gas generator 1 provides the energy for the actuation of the electrical and hydraulic drive units of the power supply auxiliary. The gas generator output may have to be reduced to a lower pressure prior to its introduction to the hydraulic and electrical units. This may be effected by means of conventional pressure reducers 5 and 6. Normally the gas pressure required for the operation of the electrical unit is less than that required for the operation of the hydraulic unit. For this reason the gas conducted to the electrical unit 2 passes through both pressure reducers connected in series, while the gas transmitted to the hydraulic unit 3 passes only through pressure reducer 5.

The electrical unit 2 preferably comprises a turbo alternator of an appropriate type. The pressure-reduced gas is then conducted into the turbine portion of the electrical unit where the energy is utilized to drive the rotor of the alternator portion 8, and to produce an electrical voltage output across terminals 9.

The hydraulic unit 3 of the power supply comprises an hydraulic fluid reservoir 10 which is normally at atmospheric pressure. A conduit means 11 is connected from the reservoir 10 through an initiating valve 12 and a check valve 13 to a fluid injector 14 which is adapted to pump increments of fluid from the reservoir through a check valve 15 into a demand vessel 16. The initiating valve 12 is adapted to open the conduit 11 to the passage of hydraulic fluid from the reservoir 10 at missile launch. This may be effected by means of an electrical signal through switch 17 indicating that the missile has been launched. Both check valves 13 and 15 are of the type which permit fluid flow in one direction only, as indicated by the arrows. The fluid injector 14 comprises a cylinder 18 having an inlet port 19 for the entry of hydraulic fluid from the reservoir 10. A spring-loaded piston 20 is employed to force the fluid entering the injector through the check valve 15 into the demand vessel 16. The piston 20 of the injector is operated by the pressurized gas from gas generator 1. This gas passes through an on-off or command valve 21 before being introduced into the fluid injector.

The demand vessel 16 comprises a fluid line having two branches. One of the branches passes through a relief valve 22 back into the fluid reservoir 10. This relief valve tributary is included to pass any excess hydraulic fluid back into the reservoir. The other branch terminates in a capped tubular riser 23. The riser is in effect a miniature accumulator whose capacity or value is essentially that of the line. The riser contains an elastic fluid charge 24 which is separated from the hydraulic fluid in the demand vessel 16 by means of a diaphragm 25. The riser is employed to maintain the pressure on the hydraulic fluid within the demand vessel above a predetermined minimum. This is done by means of the pressurized elastic fluid 24 which maintains a compressive force on the hydraulic fluid through the diaphragm 25.

The hydraulic fluid in the manifold or demand vessel 16 is connected through control command valves 26 and 27 to drive the hydraulically operated pistons 4 of the actuator unit which is employed to power the aerodynamic control surfaces of the missile. The command valves 26 and 27 are adapted to pass fluid to the pistons 4 of the actuator unit only when actuation of the missile control surfaces is required. This is effected by means of electrical signals derived from the guidance system of the missile. Exhaust hydraulic fluid from the actuator unit is returned to the reservoir through a check valve 28 by means of a fluid return line 29.

In operation the initiating valve 12 opens conduit 11, whereupon fluid flows from the fluid reservoir 10 into the injector 14. When the guidance system indicates the need for actuation of the missile control surfaces, a command signal is sent to the control command valves 26 and 27 and the on-off or command valve 21. The valve 21 then permits pressurized gas to enter the fluid injector 14 and drive the piston 20 against the force of the spring, whereupon fluid is driven past the check valve 15 into the manifold or demand vessel 16. Upon the completion of the pulse stroke the spring returns the piston to its initial position. Fluid from reservoir 10 is thus forced into the injector by the vacuum created, in readiness for the next pumping stroke of the injector. On the other hand, compressed fluid forced into the demand vessel 16 is prevented from returning to the injector by check valve 15.

The command signal which initiates the pumping stroke of fluid injector 14 also opens the demand valves 26 and 27. This permits hydraulic fluid to flow therethrough and to operate the pistons 4 of the actuator unit. The riser 23 by its action maintains a predetermined working pressure on the hydraulic fluid within the demand vessel between the pumping strokes of the fluid injector. Thus the hydraulic fluid is always sufficiently energized to operate the actuator unit. To this end, in the illustrated embodiment, the displacement of the fluid injector and capacity of the demand vessel should exceed the fluid demand of the actuator between pumping strokes.

The above-described hydraulic unit efficiently operates the missile actuator units while pressurizing only working increments of hydraulic fluid rather than the total fluid volume within the reservoir. In this way the pressurizing components may be materially reduced in size and weight and the total hydraulic unit made compact and lightweight in accordance with aerodynamic design requirements.

A preferred embodiment of the hydraulic unit has been described. Other alternatives may be employed which are within the scope of the invention. For example, the riser 23 may be entirely eliminated if a compounded inelastic fluid, such as silicones, is employed. Such a fluid is compressible to a degree and will therefore pressurize itself within the demand vessel. Where the term "substantially inelastic fluid" is employed in the specification and appended claims, it is intended to include within its meaning conventional hydraulic fluids and the compounded inelastic fluids above described.

Another possible alternative is the replacement of the demand valve 21 and fluid injector 14 by a high-speed ball pump driven by the turbine portion 7 of the electrical unit 2. In addition, the gas out of generator 1 may advantageously be tapped prior to flowing into the injector 14 to be cooled by passing through coils immersed in the fluid within the reservoir 10.

While any suitable gas generator may be employed with the electrical and hydraulic units as illustrated in FIG. 1, the basic concept provides two separate but related inventions which contribute to the compactness and light weight of the total power supply auxiliary. One of these inventions is illustrated in FIGS. 2, 3, and 4 of Patent No. 3,088,696, and employs the working increment on demand principle to effect economy of space and weight.

Figure 2:
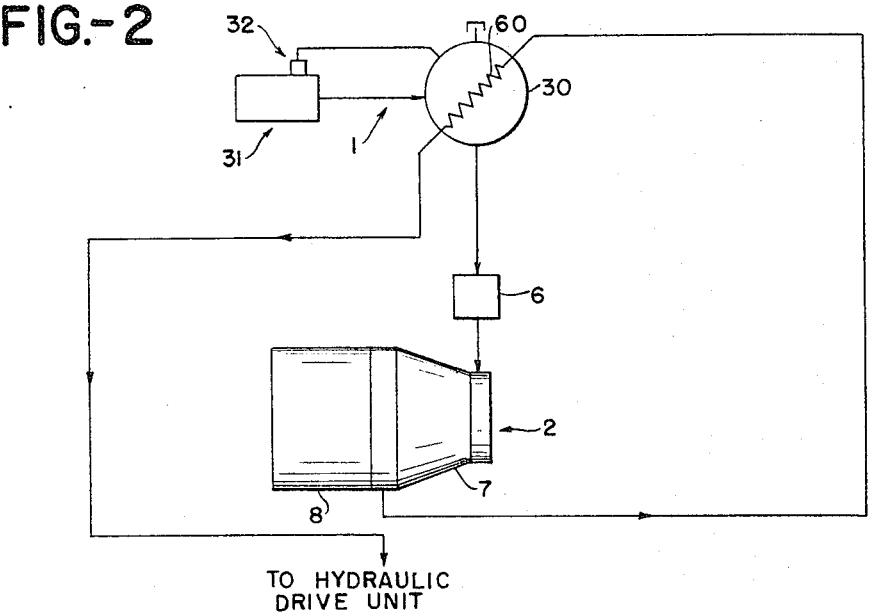
FIG. 2 is a schematic diagram of a series arrangement of cooling means associated with the power supply auxiliary of the invention.
Figure 3:
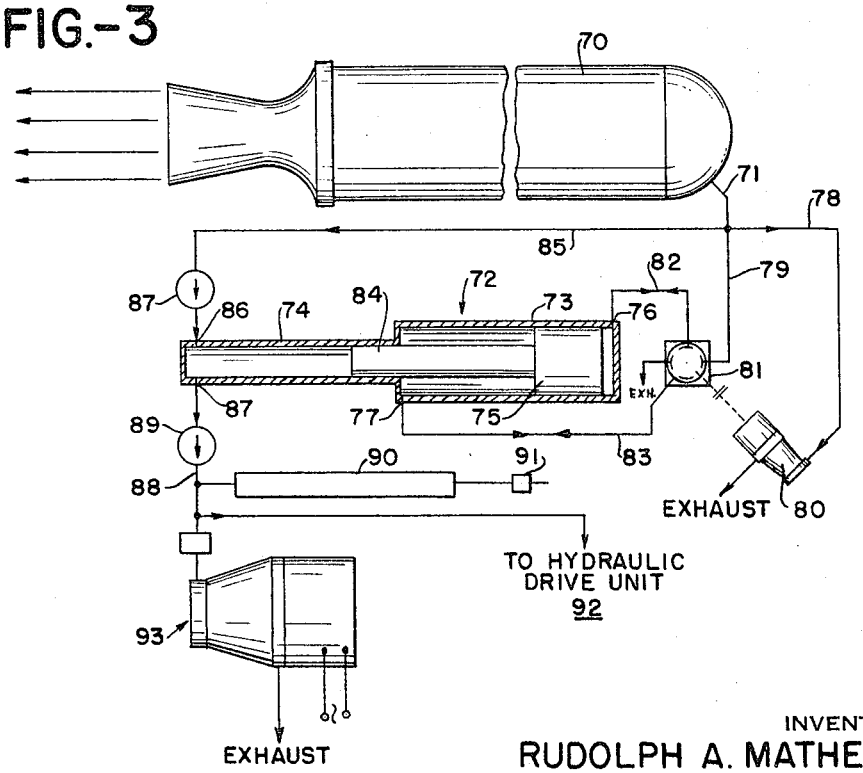
FIG. 3 is a view of an alternative embodiment of the gas generator employed in FIG. 1.

It should be noted in employing the gas generator of FIGS. 2, 3, and 4 of Patent No. 3,088,696 that the hydraulic and electrical drive units may be connected in parallel as in FIG. 1 or in series as in FIG. 2. In either event, and as illustrated in FIG. 2, the exhaust gases from the alternator 8 may be cycled through a coil 60 arranged about the storage vessel 30 of the gas generator 1. This coil acts to cool the gas within the storage vessel 30 and to heat the exhaust gases in order to prevent freezing of the control valves. In the parallel arrangement illustrated in FIG. 1 the exhaust gases, after cooling the gas within the storage vessel 30, would be emptied into the atmosphere.

Insofar as the present invention is concerned, the preferred gas generator embodiment, employing energy generated by the propulsion motor of the missile, is illustrated in FIG. 3. Ordinarily missile propulsion is effected by means of a reaction motor 70 ejecting an elastic fluid from a generation chamber at some predetermined pressure and temperature and for a period of time usually less than the flight time of the missile. Heretofore this difference in "burning time" and missile flight time has been an obstacle to the employment of energy produced by the propulsion motor for operating the electrical and hydraulic units of the missile due to the requirement that these units be powered throughout the missile flight time. The gas generator provided by the invention is adapted to convert energy from a missile reaction motor into electrical and hydraulic power not only while the reaction motor is operative but also during the interval of time between motor "burn out" and target-strike.

The improved gas generator comprises conduit means 71 connected to the propulsion motor of the missile to abstract pressurized gas therefrom. This gas is normally at a pressure less than that required for the operation of the drive units of the missile. In order to raise the pressure up to the required value the invention provides a compressor engine 72. This engine is operable by a portion of the bled gas from propulsion motor 70 and adapted to compress another portion of such bled gas. To this end the engine is of the reciprocating type and comprises an operating cylinder 73 and a compression chamber 74. The operating cylinder 73 is provided with a reciprocating piston 75, and a pair of ports 76 and 77 arranged at opposite ends thereof. To operate the piston a portion of the bled gas abstracted through the conduit 71 is conducted into two tributary conduits 78 and 79. Tributary conduits 78 conducts gas into a gear turbine 80, the mechanical output of which is employed to drive the vanes of a rotary distribution valve 81. The distribution valve has an inlet port connected to tributary conduit 79, and a pair of outlet ports, one of which is connected through conduit 82 to port 76 at one extreme of the operating cylinder, and the other of which is connected through conduit 83 to port 77 at the other extreme of the operating cylinder. In this manner gas is alternately conducted through the valve 81 into one port and then into the other port to reciprocate the operating piston 75 within the operating cylinder 73.

The compression chamber 74 is provided with a compressor piston 84 which is linked to the operating piston 75. Thus the compressor piston 84 reciprocates within the compressor chamber 74 in response to the drive provided by the operating piston 75. The conduit 71 conducts a portion of the bled gas into another tributary 85 which is connected to an inlet port 86 within the compression chamber. A check valve 87 is provided in tributary 85 to entrap the gas within the compression chamber 74. Thus when the operating piston 75 drives the compressor piston 84 within the compression chamber, the entrapped gas is compressed to a predetermined higher pressure. This pressurized gas is then conducted out of the compressor chamber through an outlet port 87 by means of a conduit 88 having a check valve 89 for preventing the re-entry of pressurized gas into the compression chamber.

In order to provide a continuously available supply of pressurized gas to the drive units of the missile, the improved gas generator includes an accumulator tank 90 adapted to store the pressurized gas output of the compressor engine. A safety valve 91 is advantageously connected to the accumulator to control the pressure therewithin. The conduit means 88 then leads from the gas accumulator 90 to the drive units 92 and 93 of the missile. Exhaust gas from the turbo alternator 93 may be employed prior to its discharge into the atmosphere to cool the compressed gas input and/or output to the compressor chamber. The exhaust of the gear turbine 80 may also be employed for this purpose.

The size and weight of the interim accumulator tank 90 is proportional to the difference between the missile flight time and the motor buring time. Ordinarily the motor burning time is in a range of 50 percent to 80 percent of the missile flight time. Thus the accumulator may be called upon to supply enough gas to power the drive units for half of the total missile flight time.

The bled gas type of gas generator above described may only be used with missiles employing propulsion motors of the pressurized gas reaction type. Within such a missile it provides pressurized gas at the optimum pressure required, throughout the missile flight time, and with the use of relatively small and lightweight components. In addition, such a gas generator can be stored for a considerable period of time without appreciable loss of effectiveness so that upon ignition it very quickly meets the maximum power demands of the missile.

Preferred embodiments of the invention have been de-

I claim:

1. In an airborne guided missile the combination of a reaction propulsion motor employing pressurized gas, and a generator for providing a continuously available supply of pressurized gas to power a drive unit for control equipment within said missile, said generator comprising first conduit means connected to bleed pressurized gas from said propulsion motor, a compressor engine operable by pressurized gas from said first conduit means and connected to compress gas from said first conduit means to a predetermined higher pressure at an outlet port, an accumulator tank adapted to store pressurized gas therein, second conduit means connected to conduct pressurized gas from the said compressor engine outlet port into the said accumulator tank for storage and to a drive unit for the operation thereof, and valve means connected in said second conduit means and adapted to permit gas flow therethrough in response to the operating requirements of a drive unit.

2. In an airborne guided missile, the combination of a reaction propulsion motor employing pressurized gas, and a generator for providing a continuously available supply of pressurized gas to power a drive unit for control equipment within said missile, said generator comprising first conduit means connected to bleed pressurized gas from said propulsion motor, a compressor engine comprising an operating cylinder and a compression chamber, an operating piston within said cylinder, a compressor piston within said chamber, linkage means connecting said operating piston to said compressor piston, a pair of ports arranged one at an opposite end of said cylinder respectively, an outlet port for said chamber, and an inlet port for said chamber connected to said first conduit means, a distribution valve means having an inlet port connected to said first conduit means, and a first and second outlet port connected to a separate one of said cylinder inlet ports respectively, said valve being adapted to direct pressurized gas entering its said inlet port alternately to its said first and to its said second outlet port to reciprocate said operating piston within said cylinder, whereby the said compressor piston is reciprocally driven within said chamber through the said linkage means and compresses gas entering the said compression chamber inlet port to a predetermined higher pressure at the said compression chamber outlet port, an accumulator tank adapted to store pressurized gas therein, second conduit means connected to conduct pressurized gas from said compression chamber outlet port into said accumulator tank for storage and to the said auxiliary drive unit for the operation thereof, and valve means connected in said second conduit means and adapted to permit gas flow therethrough in response to the operating requirements of the drive unit.

3. The combination in accordance with claim 2 in which the said distribution valve includes a rotary vane directing pressurized gas entering the said valve inlet port alternately to the said first and to the said second valve outlet port, and a turbine connected and adapted to be operable by pressurized gas from said first conduit means and mechanically linked to drive said rotary vane.

4. In an airborne guided missile, the combination of a reaction propulsion motor employing pressurized gas, and a power supply auxiliary system for control equipment within said missile, latter system comprising first conduit means connected to bleed pressurized gas from said propulsion motor, a compressor engine operable by pressurized gas from said first conduit means and connected to compress gas from said first conduit means to a predetermined higher pressure at an outlet port, an accumulator tank adapted to store pressurized gas therein, a reservoir of substantially inelastic fluid, a demand vessel, a fluid injector operable by pressurized gas and connected to pump increments of substantially inelastic fluid from said reservoir into said demand vessel, said demand vessel being adapted to maintain the pressure of the substantially inelastic fluid pumped therein above a predetermined minimum, second conduit means connected to conduct pressurized gas from the said compressor engine outlet port into the said accumulator tank for storage and to the said fluid injector for the operation thereof, an actuator unit for driving the said missile control equipment and operable by pressurized substantially inelastic fluid, third conduit means connected to introduce pressurized susbtantially inelastic fluid from said demand vessel to said actuator unit for the operation thereof, and valve means connected in said third conduit means and adapted to permit fluid flow therethrough in response to the operating requirements of said actuator unit.

5. The combination in accordance with claim 4 which further comprises a command valve connected in said second conduit means and adapted to permit gas flow therethrough in response to the operating requirements of the said actuator unit.

6. A rechargeable accumulator system for supplying hydraulic power for use by missile control equipment or the like comprising propulsion engine means for generating high pressure fluid, differential compressor means connected to said engine means and designed to convert a portion of such high pressure fluid to a higher pressure, and rechargeable accumulator means connected to said compressor means for storing pressure generated by said differential compressor means for subsequent use by actuator means, whereby in the event said engine means ceases the generation of high pressure fluid, the energy stored in said accumulator means will be available for continued operation of the actuator means.

References Cited by the Examiner

UNITED STATES PATENTS

| | | | |
|---|---|---|---|
| 2,231,307 | 2/1941 | Wallace | 230—52 |
| 2,539,292 | 1/1951 | Anderson | 230—52 |
| 2,584,127 | 2/1952 | Harcum et al. | 114—23 |
| 2,592,940 | 4/1952 | Monoyer | 103—51 |
| 2,864,313 | 12/1958 | Dawson | 103—50 X |

SAMUEL FEINBERG, *Primary Examiner.*

CHESTER L. JUSTUS, *Examiner.*